United States Patent [19]

Suzuki

[11] 4,408,497
[45] Oct. 11, 1983

[54] ELECTROMAGNETIC FLOWMETER FOR MEASURING FERROMAGNETIC SLURRIES

[75] Inventor: Kazuie Suzuki, Tokyo, Japan

[73] Assignee: Hokushin Electric Works, Ltd., Tokyo, Japan

[21] Appl. No.: 333,327

[22] Filed: Dec. 22, 1981

[51] Int. Cl.³ .............................................. G01F 1/60
[52] U.S. Cl. .................................. 73/861.17; 364/510
[58] Field of Search ........... 73/861.12, 861.16, 861.17; 364/510

[56] References Cited

U.S. PATENT DOCUMENTS 3,380,301  4/1968  Mannherz et al. ............... 73/861.16
4,218,915  8/1980  Torimaru ......................... 73/861.16
4,238,410 12/1980  Appel et al. ..................... 73/861.16

FOREIGN PATENT DOCUMENTS 838279  6/1960  United Kingdom ............. 73/861.16

Primary Examiner—Herbert Goldstein
Attorney, Agent, or Firm—Michael Ebert

[57] ABSTRACT

An electromagnetic flowmeter for measuring the flow rate of a ferromagnetic slurry which is conducted through a flow tube having electrodes mounted thereon, the slurry intercepting a magnetic field to induce a signal in the electrodes which depends on flow rate. The field is established by an electromagnetic circuit whose core has a gap defined by the tube, an excitation coil being wound about the core. The magnetic resistance of the circuit changes as a function of the ferromagnetic concentration of the slurry, this change affecting the inductance of the coil. To provide an output signal which accurately reflects flow rate regardless of ferromagnetic concentration, the output signal is corrected in accordance with the changing inductance of the excitation coil.

5 Claims, 17 Drawing Figures (a)
(b)

(a) MEASUREMENT OF TIME $t_0$
(b) MEASUREMENT OF VOLTAGE $V_1$
(c) MEASUREMENT OF FLOW RATE

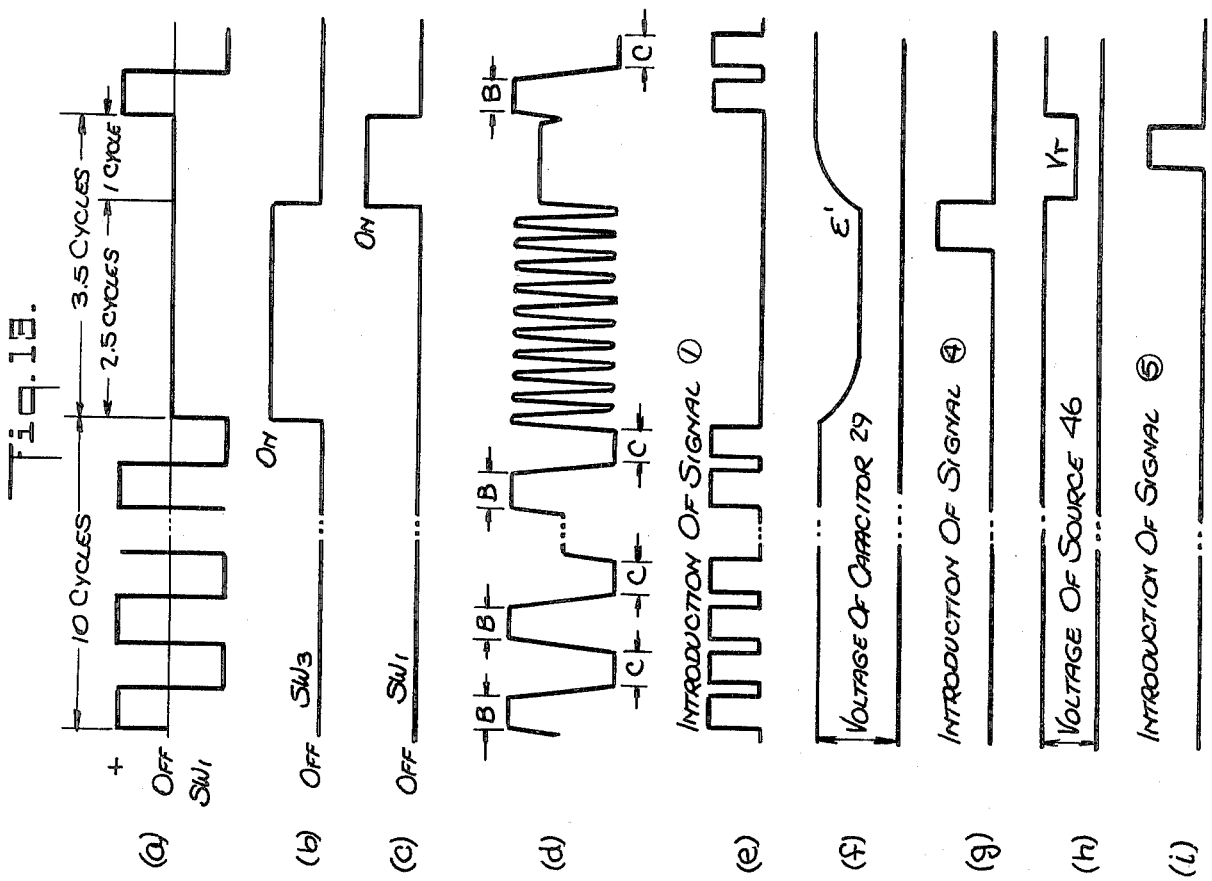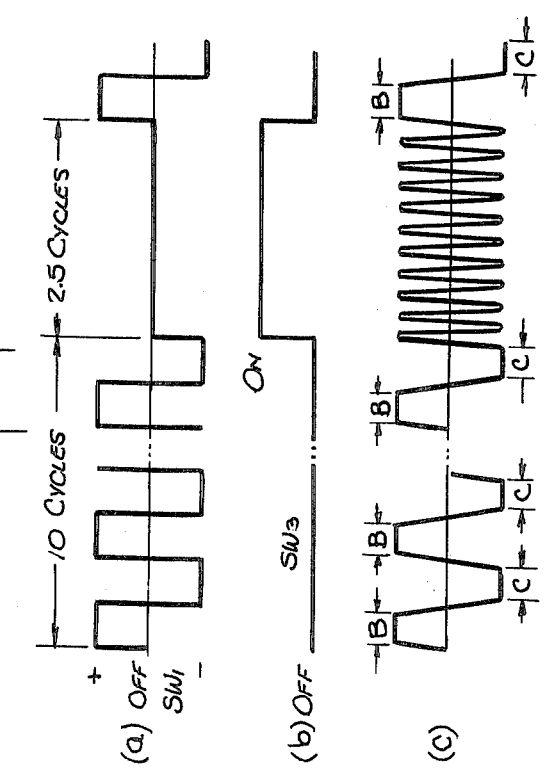

1

ELECTROMAGNETIC FLOWMETER FOR MEASURING FERROMAGNETIC SLURRIES

BACKGROUND OF INVENTION

This invention relates generally to electromagnetic flowmeters, and in particular to a meter of this type which measures the flow rate of a slurry containing ferromagnetic particles of a like magnetic substance, the meter providing an accurate measurement regardless of the ferromagnetic concentration.

An electromagnetic flowmeter is adapted to measure the flow rates of those fluids which present difficult handling problems, such as corrosive acids, sewage slurries, detergents and the like. In a flowmeter of this type, the liquid whose flow rate is to be measured is conducted through a flow tube provided with a pair of diametrically-opposed electrodes, a magnetic field perpendicular to the longitudinal axis of the tube being established by a pair of diametrically-opposed electromagnets. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator, or to supply an input variable to a process control system.

The electromagnetic force signal established across the electrodes of the flowmeter is a function of the flow velocity of the fluid being metered. This electromagnetic force depends on the specific permeability of the fluid which, in the case of water, is approximately equal to unity. But where the fluid being metered takes the form of a slurry containing ferromagnetic particles or like magnetic substances, the specific permeability of the fluid becomes significantly larger than unity, thereby increasing the electromagnetic force signal.

When, therefore, an electromagnetic flowmeter calibrated to measure the flow rate of water is used to meter a ferromagnetic slurry, the indicated flow rate will be in error to an extent that depends on the concentration of the ferromagnetic slurry. If the slurry concentration is substantially constant, then the flowmeter can be corrected to take this concentration into account. But if the concentration is subject to change in the course of operation, then, as a practical matter, one cannot make the necessary corrections.

SUMMARY OF INVENTION

In view of the foregoing, the main object of this invention is to provide an electromagnetic flowmeter capable of accurately measuring the flow rate of a slurry containing ferromagnetic particles or like magnetic substances.

More particularly, an object of this invention is to provide a flowmeter of this type which acts to detect changes in the inductance of its excitation coil in response to changes in the ferromagnetic concentration of the slurry passing through the flow tube and intercepting the magnetic field established therein, the detected changes in inductance serving to correct the output signal of the meter.

Also an object of this invention is to provide an accurate meter of the above type of relatively simple design that operates reliably and efficiently and which lends itself to construction at modest cost.

Briefly stated, these objects are attained in an electromagnetic flowmeter for measuring the flow rate of a ferromagnetic slurry which is conducted through a flow tube having electrodes mounted thereon, the slurry intercepting a magnetic field to induce a signal in the electrodes which depends on flow rate. The field is established by an electromagnetic circuit whose core has a gap defined by the tube, an excitation coil being wound about the core. The magnetic resistance of the circuit changes as a function of the ferromagnetic concentration of the slurry, this change affecting the inductance of the coil. To provide an output signal which accurately reflects flow rate regardless of ferromagnetic concentration, the output signal is corrected in accordance with the changing inductance of the excitation coil.

OUTLINE OF DRAWINGS

For a better understanding of the invention as well as other objects and further features thereof, reference is made to the following detailed description to be read in conjunction with the accompanying drawings, wherein:

FIG. 1 schematically shows the primary of a conventional electromagnetic flowmeter;

FIG. 10 is a waveform diagram illustrating the operation of various components in FIG. 9;

FIG. 13 is a waveform diagram illustrating the operation of various components in FIG. 12;

DESCRIPTION OF INVENTION

Prior Art

Figure 1:
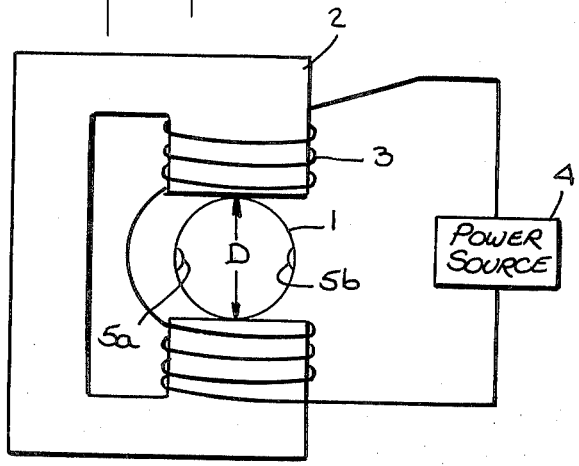

Referring now to FIG. 1, there is shown the primary or transmitter of a conventional electromagnetic flowmeter, the fluid to be metered being conducted through an insulated flow tube 1 having a diameter D. A magnetic field is established across the flow tube by means of any electromagnet whose core 2 has a large specific permeability, an excitation coil 3 being wound about the opposed legs of the core.

The gap between the legs of the core has a value D which is effectively equal to the diameter of the flow tube. The number of turns of coil 3 is represented by value N, the coil being excited by a power source 4. Mounted at diametrically-opposed positions on flow tube 1 are electrodes 5a and 5b.

Assuming that the magnetic field established in the flow tube which is intercepted by the fluid flowing therethrough, is uniform or homogeneous, there will be developed across electrodes 5a and 5b, an electromotive force E proportional to the mean flow velocity v of the fluid regardless of the distribution of its flow and velocity.

The value of E is given by the following expression:

$$E = K_1 \cdot B \cdot D \cdot v \qquad (Eq.\ 1),$$

where $K_1$ is a constant and B is the magnetic flux density.

Considering now flux density B, inasmuch as the magnetic circuit of the flowmeter has a large gap D in its magnetic path, its magnetic resistance depends almost entirely on this gap. Representing the specific permeability of the fluid by symbol $\mu_s$, the following expression is obtained under Ampere's law:

$$N \cdot i = B \cdot D / \mu_s \mu_o \qquad (Eq.\ 2)$$

where (i) is the current flowing through excitation coil 3 and ($\mu_o$) is vacuum permeability. From equations 1 and 2, the following expression may be derived:

$$E = K_1 \cdot N \cdot i \cdot \mu_s \cdot \mu_o \cdot v \qquad (Eq.\ 3)$$

When the fluid being metered is water whose specific permeability $\mu_s$ is about equal to unity, the value of electromotive force E is given by the following expression:

$$E = K_1 \cdot N \cdot i \cdot \mu_o \cdot v \qquad (Eq.\ 4)$$

As indicated previously, an electromagnetic flowmeter yields a signal proportional to the mean flow velocity of the fluid being metered. Because a meter of this type in no way obstructs the flow of fluid through the flow tube, it may be used to measure the flow rate of slurries; that is, a fluid containing insoluble matter such as mud or other fine particles.

Where the slurry being metered contains ferromagnetic particles or like magnetic substances, the apparent specific permeability $\mu_s$ of the fluid then becomes larger than unity, and this gives rise to the problem to which the present invention is addressed.

From equation 3, it will be evident that the value E of the electromotive force signal will be greater than the value obtained when specific permeability $\mu_s$ is approximately equal to unity when permeability is larger than unity, and that this is true even if the fluid flow velocity remains unchanged.

Figure 2:
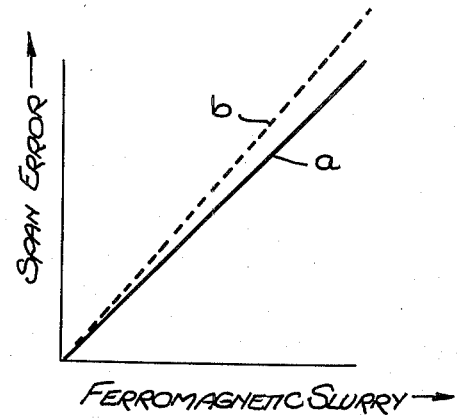
FIGS. 2 and 3 are graphs explanatory of the measurement errors which arise in a conventional flowmeter when used to measure a ferromagnetic slurry.
Figure 3:
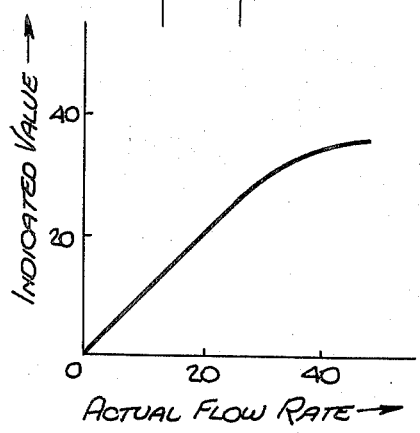

As a consequence, if a flowmeter is employed which is calibrated to meter the flow of a slurry containing ferromagnetic particles, then the reading will be in error. This is shown in FIG. 2, in which the relationship between actual flow rate and the indicated value is shown. The error is indicated by dotted line curve (b), curve (a) being the flow rate with water, and curve (b) the flow rate with a ferromagnetic slurry. As shown in FIG. 3, in which the concentration of the ferromagnetic slurry is plotted against span error, this error increases with an increase in concentration.

When metering a ferromagnetic slurry with an electromagnetic flowmeter, if the slurry concentration remains constant, one can correct the error. But, if the slurry concentration varies, a mere correction is not sufficient. By successively correcting errors while measuring the slurry concentration by means of associated measuring apparatus, one can employ the electromagnetic flowmeter. But in that case, too, the amount of correction varies with the composition of the slurry even if its concentration remains constant, so that the electromagnetic flowmeter still provides an inaccurate reading.

The Invention

The present invention provides an electromagnetic flowmeter which solves the problem caused by the presence of magnetic substances in the fluid being metered. When a magnetic substance is included in the fluid being metered, the magnetic resistance of the magnetic circuit of the electromagnetic flowmeter changes to cause a change in the inductance of the excitation coil. The present invention effects correction of the flow rate signal in accordance with the inductance of the excitation coil.

In the conventional electromagnetic flowmeter shown in FIG. 1, letting the inductance and the cross-sectional area of the excitation coil 3 be represented by symbols L and S, respectively, the following expression is obtained:

$$L = N \cdot S \cdot \frac{dB}{di} \qquad (Eq.\ 5)$$

From the expression (2), $$B = \frac{N \cdot i}{D} \cdot \mu_s \cdot \mu_o$$

so that the following expression is obtained from expression (5):

$$L = \frac{N^2 \cdot S}{D} \cdot \mu_s \cdot \mu_o \ \therefore\ \mu_s \cdot \mu_o = \frac{L \cdot D}{N^2 \cdot S} \qquad (Eq.\ 6)$$

By substituting expression (6) in expression (3), the following expression is obtained:

$$E = K_1 \cdot N \cdot i \cdot \frac{L \cdot D}{N^2 \cdot S} \cdot v \qquad (Eq.\ 7)$$

$$= \frac{k_1 \cdot D}{N \cdot S} \cdot L \cdot i \cdot v \ \therefore\ v = \frac{N \cdot S}{K_1 \cdot D} \cdot \frac{E}{L \cdot i}$$

where $N \cdot S / K_1 \cdot D$ is an inherent value of the electromagnetic flowmeter and remains unchanged.

Accordingly, by measuring inductance L of excitation coil 3 and dividing the electromotive force signal E by the measured inductance value, one obtains a signal proportional only to the velocity of flow v of the fluid irrespective of its permeability so long as the excitation coil current i is held constant or the signal electromotive force is further divided by the current i.

First Embodiment

Figure 4:
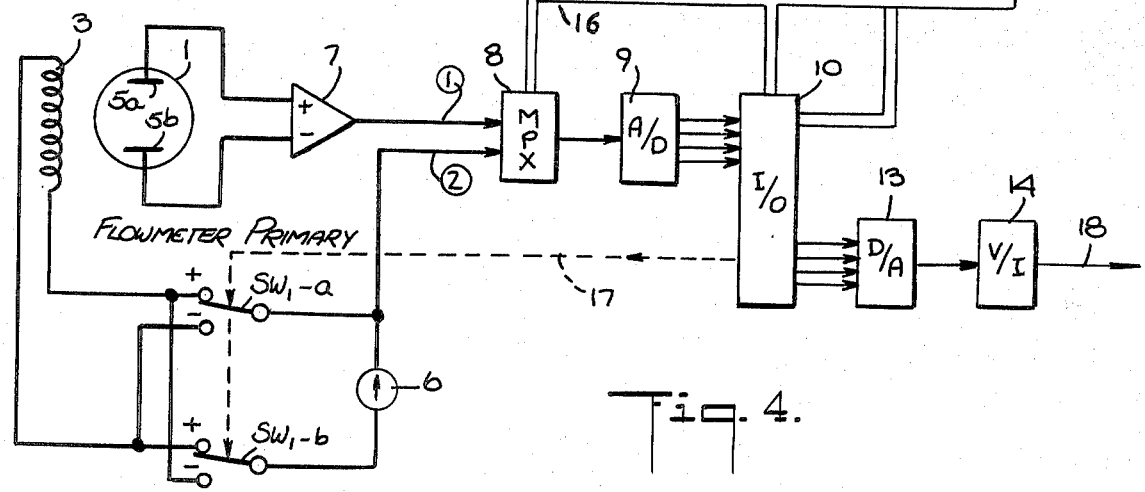
FIG. 4 is a block diagram illustrating a first embodiment of a flowmeter in accordance with the invention.

FIG. 4 illustrates in block form a first embodiment of the invention in which excitation coil 3 is energized by positive and negative rectangular wave currents. The rise time of excitation current i is measured, from which inductance L is calculated. This measurement and calculation are carried out by a microcomputer in terms of software.

In FIG. 4, reference numeral 6 indicates a DC constant-current excitation power source; numeral 7 designates a differential amplifier for converting the electromotive force developed across the electrodes 5a and 5b into a corresponding impedance and for amplifying it; numeral 8 identifies a multiplexer (MPX); numeral 9 denotes an analog-to-digital converter (A/D); numeral 10 represents an input/output port (I/O); numeral 11 refers to a microprocessor (CPU); numeral 12 refers to a memory (ROM/RAM); numeral 13 indicates a digital-to-analog converter (D/A); numeral 14 designates a voltage-to-current converter (V/I); numeral 15 identifies a data bus; numeral 16 denotes an address bus; and numeral 17 represents a signal for controlling switches $SW_1$ (a and b).

Figure 5:
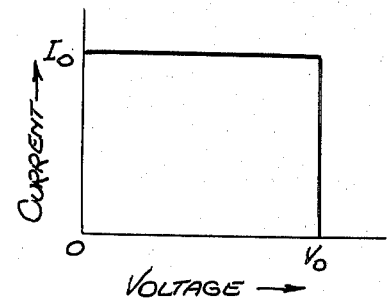
FIG. 5 is a curve showing the characteristics of a DC constant-current power source.

The current-voltage characteristic of DC constant-current power source 6 is shown in FIG. 5. When source 6 is connected to a load having an inductance, such as excitation coil 3, it serves as a constant-voltage source yielding a voltage $V_O$ immediately after being connected to the load. But after the current increases and attains a constant value $I_O$, it functions as a constant-current source yielding a current value $I_O$. Switches $SW_{1-a}$ and $SW_{1-b}$ act to invert the polarity of excitation power source 6 at a relatively low frequency, its operation being controlled by the signal from amplifier 7 which is applied via input/output port 10 from microprocessor 11.

Figure 6:
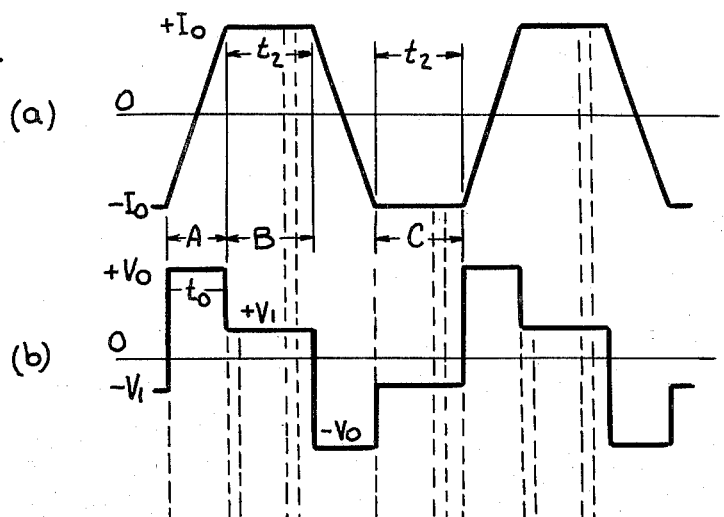
FIG. 6 shows the waveforms of current and voltage in the excitation coil.

That is, the excitation coil 3 is supplied with a current having the waveform shown in FIG. 6(a) and a voltage having the waveform shown in FIG. 6(b). Current $i_A$ produced in the period in which the excitation coil current changes from $-I_O$ to $+I_O$—that is, in a period A in FIG. 6(a)—, assumes the value given by the following expression:

$$i_A = \frac{V_O}{r} - \left(I_O + \frac{V_O}{r}\right) e^{-\frac{r}{L} \cdot t} \qquad \text{(Eq. 8)}$$

where r is a DC resistance. The time of period A is measured, and if its value is $t_O$, then it follows from the expression that:

$$I_O = \frac{V_O}{r} - \left(I_O + \frac{V_O}{r}\right) e^{-\frac{r}{L} \cdot t_O}$$

Rearranging this, it follows that $$L = \frac{r \cdot t_O}{\log \frac{V_O/r + I_O}{V_O/r - I_O}} \qquad \text{(Eq. 9)}$$

Thus inductance L can be calculated from the measured value of the time $t_O$. The measurement of time $t_O$ is conducted by measuring the period of time during which the excitation power source voltage is $V_O$, as will be seen from FIG. 6(b). To calculate equation 9, it is necessary to measure the DC resistance r of excitation coil 3 and an excitation lead. Value r can be obtained from the following expression by measuring the excitation power source voltage $V_1$ in a period B in which the excitation coil current is steady.

$$r = \frac{V_1}{I_O} \qquad \text{(Eq. 10)}$$

Measurement of time $t_O$ and excitation power source voltage $V_1$, the calculations of the equations 9 and 10, the measurement of the flow rate signal and the correction of the flow rate signal by inductance L are performed by a microcomputer. In the microcomputer, two input signals ① and ② are connected to multiplexer 8, from which they are selectively supplied to A/D converter 9 in accordance with an address signal from microprocessor 11. Signal ① is the output from differential amplifier 7 (the flow rate signal), while signal ② is the excitation power source voltage. The output from A.D. converter 9 is fed via input/output port 10 to microprocessor 11 and memory 12 to perform the required measurements and calculations.

Figure 7:
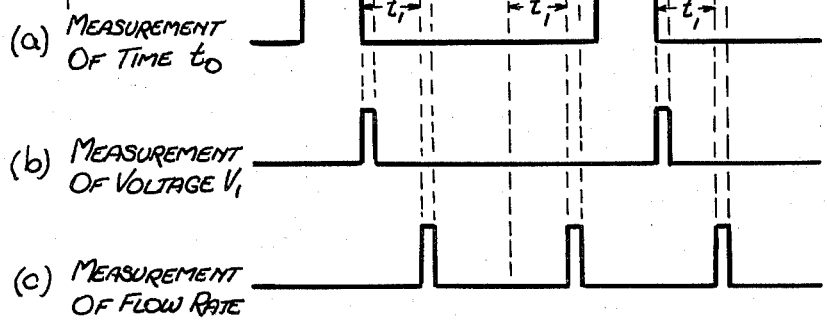
FIG. 7 shows timing charts for the measurements.

FIG. 7 shows the timing diagram for signal measurement. In FIG. 7, line (a) is the timing for measuring the time $t_O$, line (b) is the timing for measuring the excitation power source voltage $V_1$, and line (c) is the timing for measuring the flow rate signal. The flow rate signal is measured in the periods B and C in which the excitation current assumes its steady values $I_O$ and $-I_O$, respectively.

Figure 8:
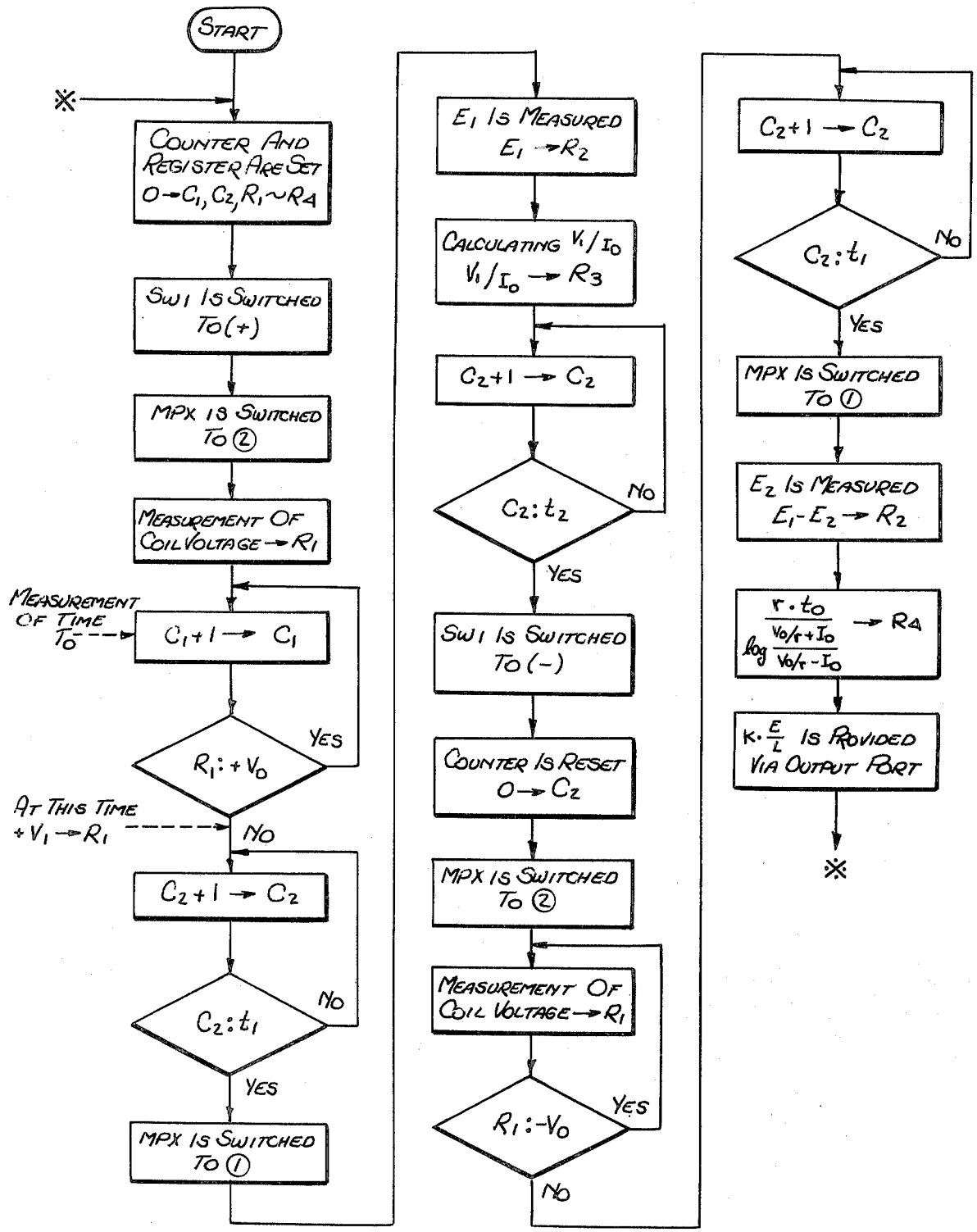
FIG. 8 is an operational flow chart for the first embodiment.

FIG. 8 shows an operation flowchart of the measurement and the calculation. In this figure, reference characters $C_1$ and $C_2$ indicate counters; characters $R_1$ to $R_4$ designate registers; character $t_1$ identifies the timing for measuring the flow rate signal in FIG. 7; and character $t_2$ denotes the timing for holding the periods B and C in FIG. 6. And *→* represents a return of the flow.

The operating program of the device of this embodiment will now be briefly described.

Step (i). Counters $C_1$ and $C_2$ and registers $R_1$, $R_2$, $T_3$ and $R_4$ are reset.

Step (ii). The input to multiplexer 8 is switched over to the excitation power source voltage measuring side ②, and this voltage is applied to register $R_1$; and time $t_O$ during which this voltage remains at $V_O$ is measured by counter $C_1$.

Step (iii). In period B, in which the excitation current assumes the constant value $I_O$, the then prevailing excitation power source voltage $V_1$ is entered into register $R_1$ and measured.

Step (iv). Upon detection of time $t_1$ by counter $C_2$, the input to multiplexer 8 is switched over to the flow rate signal measuring side ①, and a flow rate signal $E_1$ at this time is measured and entered into register $R_2$.

Step (v). The value of DC resistance r is calculated (Equation 10), and this value is entered into register $R_c$.

Step (vi). Upon detection of time $t_2$ by counter $C_2$, the polarity of excitation power source 6 is inverted, and counter $C_2$ is reset at the same time.

Step (vii). The input to multiplexer 8 is switched over to the excitation power source voltage measuring side ②, and when the voltage of register $R_1$ becomes $-V_1$, counter $C_2$ is started.

Step (viii). Upon detection of time $t_1$ by counter $C_2$, the input of multiplexer 8 is switched over to the flow signal measuring side ① and the flow rate signal $E_2$ at this time is measured; the result of the calculation $E = E_1 - E_2$ being entered in register $R_2$.

Step (ix). Inductance L is calculated (Equation 9) and the value of inductance L is entered in register $R_4$. Here, $V_O$ and $V_1$ are preset constants, and the value of time $t_O$ and the value of DC resistance r are entered, as measured and calculated in counter $C_1$ and register $R_3$, respectively, so that these values are used for calculation.

Step (x). The value of E/L is calculated and a corrected flow rate signal of 4 to 20 mADC, for example, is ultimately provided via the input/output port 10, the D/A converter 13 and the voltage-current converter 14.

Step (xi). Upon detection of time $t_2$ by counter $C_2$, the polarity of the excitation power source 6 is again inverted and counters $C_1$ and $C_2$ and registers $R_1$ to $R_4$ are reset, after which the above operations are repeated. The calculations carried out in steps (ix) and (x) take some time. Letting the time for these calculations be represented by $t_c$, the value of the time $t_2$ is set so that $t_2-t_1 \simeq t_c$, thereby making the timing for sampling the signal $E_1$ coincident with the timing $t_1'$ for sampling signal $E_2$ (see FIG. 7).

The embodiment shown in FIG. 4 makes it possible to use excitation power source 6 as a power source for measuring inductance L of excitation coil 3; hence the structure of this arrangement is simple. Moreover, the use of a micro-computer for the inductance measurement and the calculations further simplifies the constructions of this embodiment and the procedures entailed for measurement.

Second Embodiment

Figure 9:
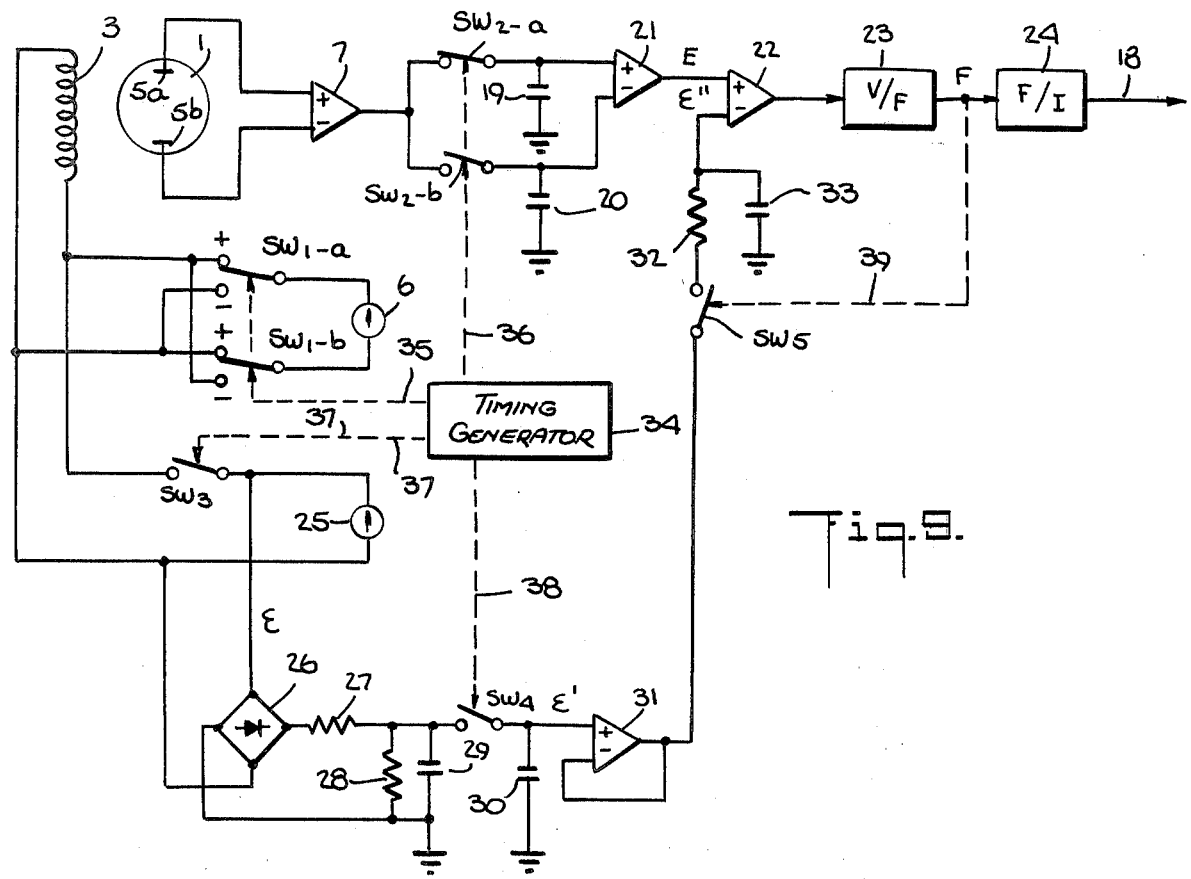
FIG. 9 is a block diagram illustrating a second embodiment of the invention.

Referring now to FIG. 9 which is a circuit diagram of the second embodiment, a separately provided AC constant-current source is connected to excitation coil 3, and its conductance L is calculated from the applied voltage. Measurement, calculation and control are carried out in this instance by hardware.

In FIG. 9, the parts corresponding to those in FIG. 4 are identified by like reference numerals. Reference characters $SW_2$ (a and b) indicate switches for sampling the output from differential amplifier 7; numerals 19 and 20 designate sampling hold capacitors; numeral 21 identifies an adder-subtractor; numeral 22 denotes a deviation amplifier formed by a differential amplifier having a large gain; numeral 23 represents a voltage-frequency converter (VF); numeral 24 refers to a frequency-current converter (F/I); numeral 25 refers to an AC constant-current power source (i.e., 100 Hz) for measuring inductance L of excitation coil 3; character $SW_3$ indicates a switch for periodically applying the AC constant-current power source 25 to excitation coil 3; numeral 26 designates a rectifier for full-wave rectifying the voltage of the AC constant-current power source 25; numerals 27, 28 and 29 respectively identify resistors and a capacitor constituting a smoothing circuit; character $SW_4$ denotes a switch for periodically sampling the output from the smoothing circuit; numeral 30 represents a capacitor for holding the sampled voltage from switch $SW_4$; numeral 31 refers to a buffer amplifier for impedance conversion use formed by a differential amplifier; character $SW_5$ refers to a switch driven by the output 39 from the voltage-frequency converter 23 to sample the output from the buffer amplifier 31; numerals 32 and 33 indicate, respectively, a resistor and a capacitor making up a circuit for smoothing the sampled output from switch $SW_5$; and numeral 34 designates a timing signal generator for generating signals 35 to 38 for driving switches $SW_1$ to $SW_4$.

The operation of this embodiment will now be described with reference to the operating waveforms developed at various points, as shown in FIGS. 10(a) to (f).

As depicted in FIG. 10(a), switch $SW_1$ for supplying a current to excitation coil 3 performs a polarity inverting function at a frequency lower than the commercial power source frequency; for example, 60/8 Hz. Switch $SW_1$ remains in its OFF state for a 2.5 cycle period; for example, after 10 cycles of the polarity-inverting operation, the switch repeats this operation. Switch $SW_3$ turns ON only in the period in which switch $SW_1$ is in the OFF state, as shown in FIG. 10(b). By reason of these operations of switches $SW_1$ and $SW_3$, the excitation coil 3 is supplied with excitation current and the AC current for measuring the inductance as illustrated in FIG. 10(c).

In contrast thereto, as shown in FIG. 10(d), the signal 36 for driving sampling switches $SW_{2-a}$ and $SW_{2-b}$ is provided so that the signal sampling may be performed in periods B and C in which excitation current reaches its positive and negative steady values, respectively (see FIG. 10(c)). The signals sampled by switches $SW_2$ are applied to adder-subtractor 21, wherein the valueof the signal sampled by switch $SW_{2-b}$ is subtracted from the valueof the signal sampled by switch $SW_{2-a}$. The output from adder-subtractor 21 is fed to deviation amplifier 22.

The AC constant-current power source 25 is an AC power source of a constant frequency higher than the excitation frequency (60/8 Hz); for example, 100 Hz or so. A voltage which is induced by this AC current in excitation coil 3 is given by the following expression:

$$\epsilon = 2\pi f L I_1 \qquad \text{(Eq. 11)}$$

where f is the frequency of power source 25, $I_1$ is its current. The DC resistance and the wiring resistance of excitation coil 3 are assumed to be negligibly small as compared with the impedance of coil 3. Voltage $\epsilon$ is rectified by rectifier 26 and smoothed by the smoothing circuit, and then converted into a DC voltage which is thereafter fed to switch $SW_4$.

The waveform of voltage occurring in capacitor 29 of the smoothing circuit is shown in FIG. 10(e). As depicted in FIG. 10(e), this voltage assumes a value proportional to the output voltage of the AL constant-current power source 25 while the switch $SW_3$ is in the OFF state. When switch $SW_3$ is turned ON, the voltage reaches a steady value $\epsilon'$ proportional to the voltage of equation (11) after a period of time determined by a smoothing time constant.

As shown in FIG. 10(f), the switch $SW_4$ is turned ON at the time at which the voltage of capacitor 29 reaches the steady value $\epsilon'$, this voltage $\epsilon'$ being held by the hold capacitor 30. Letting a proportional constant be represented by $k_2$, the voltage is given by the following expression derived from equation 11:

$$\epsilon' = K_2 L \qquad \text{(Eq. 12)}$$

Voltage $\epsilon'$, after being subjected to impedance conversion by buffer amplifier 31, is sampled by switch $SW_5$ and smoothed by resistor 32 and capacitor 33, it being thereafter applied as a negative feedback input signal to deviation amplifier 22. At this time, the switch $SW_5$ is driven by the output 39 from voltage-frequency converter 23 and turned On by a pulse which has a fixed pulse width and a frequency F proportional to the output from deviation amplifier 22. Accordingly, the negative feedback input signal $\epsilon''$ is given by the following expression:

$$\epsilon'' = K_3 F L \qquad \text{(Eq. 13)}$$

where $K_3$ is a proportional constant. To deviation amplifier 23 is applied, as one signal thereto, $$E = \frac{K_1 \cdot D}{N \cdot S} \cdot L \cdot i \cdot v$$

in equation 7. Since the gain of this amplifier is sufficiently large, $\epsilon'' = E$; that is, $$K_3 \cdot F \cdot L = \frac{K_1 \cdot D}{N \cdot S} \cdot L \cdot i \cdot v$$

Thus the following expression holds:

$$F = K_4 v \qquad \text{(Eq. 14)}$$

where $K_4$ is a proportional constant.

Accordingly, voltage-frequency converter 23 yields a frequency signal F which does not depend on the permeability of the fluid to be metered but is proportional only to its velocity of flow v. This signal F is converted by frequency-current converter 24 and ultimately yielded by the flowmeter as the corrected flow rate signal of, for example, 4 to 20 mADC.

Third Embodiment

Figure 11:
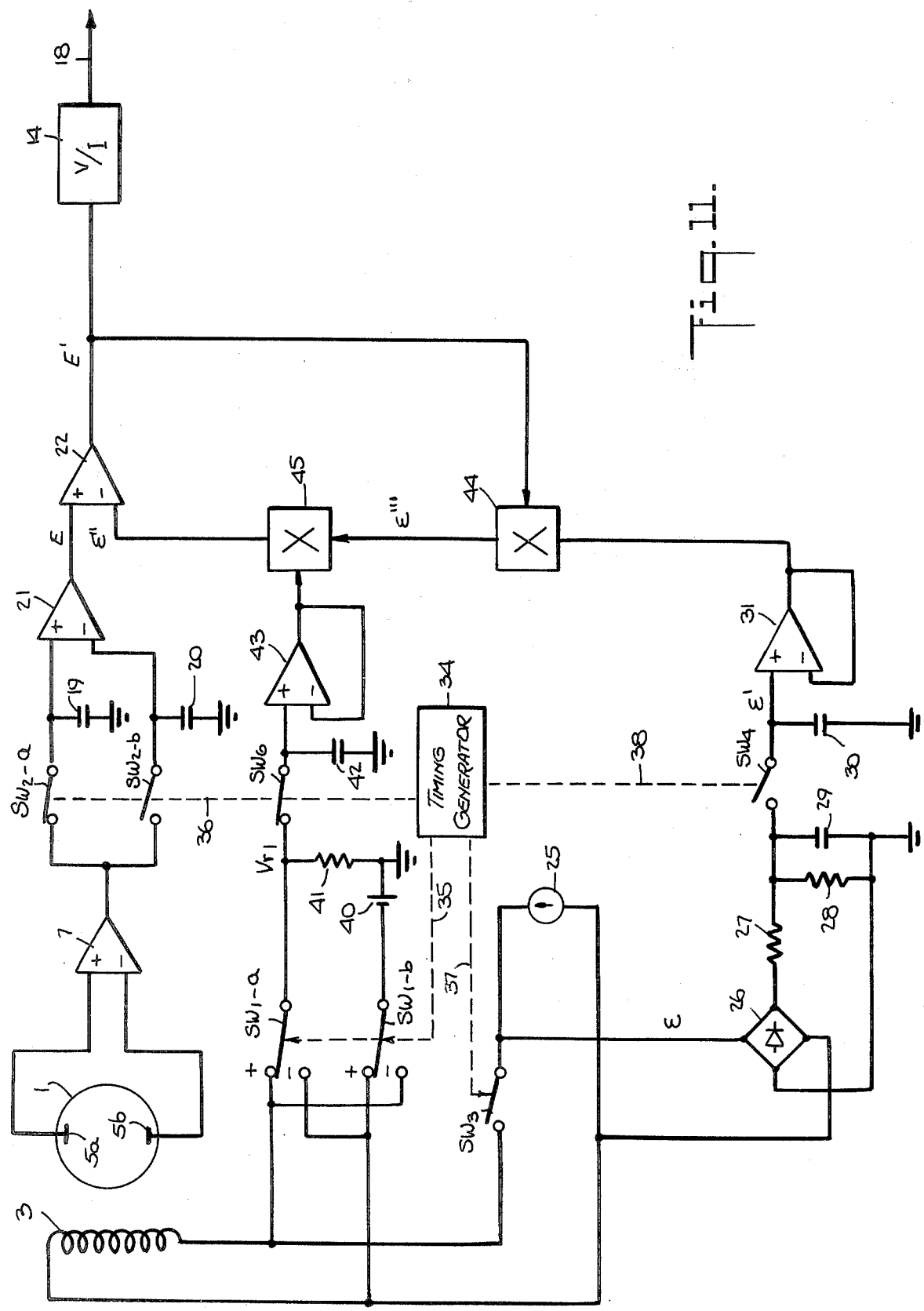
FIG. 11 is a block diagram of a third embodiment of the invention.

While in the second embodiment shown in FIG. 9, a frequency multiplier (switch SW$_5$, the smoothing circuit and V/F converter 23) is employed for supplying the negative feedback input signal $\epsilon''$ to deviation amplifier 22, it may also be replaced with an analog multiplier. Further, the DC constant-current power source 6 is used as a power source for excitation, but it is also possible to detect the excitation current by an ordinary power source and divide the flow rate signal, thereby performing the correction. FIG. 11 illustrates a third embodiment employing the above method. In FIG. 11, the parts corresponding to those in FIGS. 4 and 9 are identified by like reference numerals.

We shall now consider the differences between the second and third embodiments. In FIG. 11, reference numeral 40 indicates a simple DC power source; numeral 41 designates a resistor for detecting excitation current; numeral SW$_6$ identifies a switch for sampling the voltage of resistor 41; numeral 42 denotes a sampling hold capacitor; numeral 43 represents a buffer amplifier for impedance conversion use; and numerals 44 and 45 show analog multipliers. Output E' from deviation amplifier 22 is applied not only to voltage-current converter 14 but also to analog multiplier 44. Switch SW$_6$ is opened and closed by control signal 36 from the timing signal generator 34 in symchronism with switch SW$_2$.

Now, letting the resistance of the resistor 41 be represented by $r_1$ and its voltage by $V_{r_1}$, the voltage $V_{r_1}$ is in proportion to the excitation current i as given by the following expression:

$$V_{r_1} = r_1 \cdot i \qquad \text{(Eq. 15)}$$

Voltage $V_{r_1}$ is sampled by switch SW$_6$, and subjected to impedance conversion by buffer amplifier 43, this voltage being thereafter delivered to analog multiplier 45. On the other hand, voltage $\epsilon'$ is sampled by switch SW$_4$ and is supplied via buffer amplifier 31 to analog multiplier 44, to which is also applied the output E' from deviation amplifier 22.

The multiplied output E''' from analog multiplier 44 is fed to analog multiplier 45 of the next stage, where it is multiplied by said voltage $V_{r_1}$ to provide the negative feedback input signal E'' to deviation amplifier 22. In other words, since the output from analog multiplier 44 is $\epsilon''' = \epsilon' \cdot E'$, it follows from equation 12 that $$\epsilon''' = K_2 . L . E' \qquad \text{(Eq. 16)}$$

On the other hand, since the output from analog multiplier 45 is $\epsilon'' = \epsilon''' \cdot V_{r_1}$, the following expression is obtained from the preceding equations 15 and 16:

$$\epsilon'' = K_2 . r_1 . i . L . E' \qquad \text{(Eq. 17)}$$

The gain of deviation amplifier 22 is large and $\epsilon'' = E$, so that the following expression is obtained from the preceding equations 16 and 17:

$$K_2 \cdot r_1 \cdot i \cdot L \cdot E = \frac{K_1 \cdot D}{N \cdot S} \cdot L \cdot i \cdot v \qquad \text{(Eq. 18)}$$

$$E' = \frac{K_1 \cdot D}{K_2 \cdot r_1 \cdot N \cdot S} \cdot v$$

$$= K'_4 \cdot v$$

where $K_4'$ is a constant. Voltage E' is proportional only to the velocity of flow v of the fluid to be metered and is not dependent upon its permeability and excitation current i. Voltage-current converter 14 yields the corrected flow rate current of, for example, 4 to 20 mADC.

Fourth Embodiment

Figure 12:
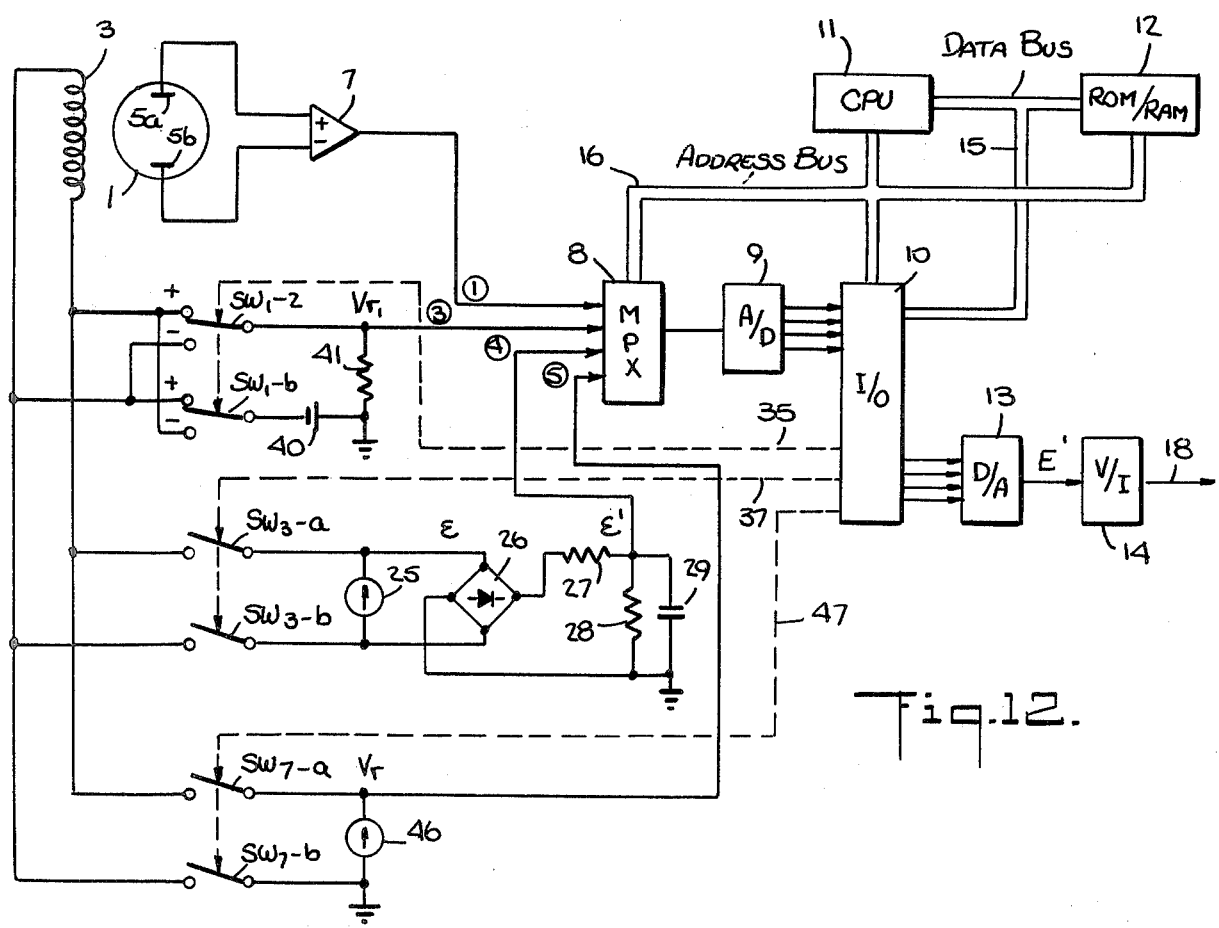
FIG. 12 is a block diagram of a fourth embodiment of the invention.
Figure 14:
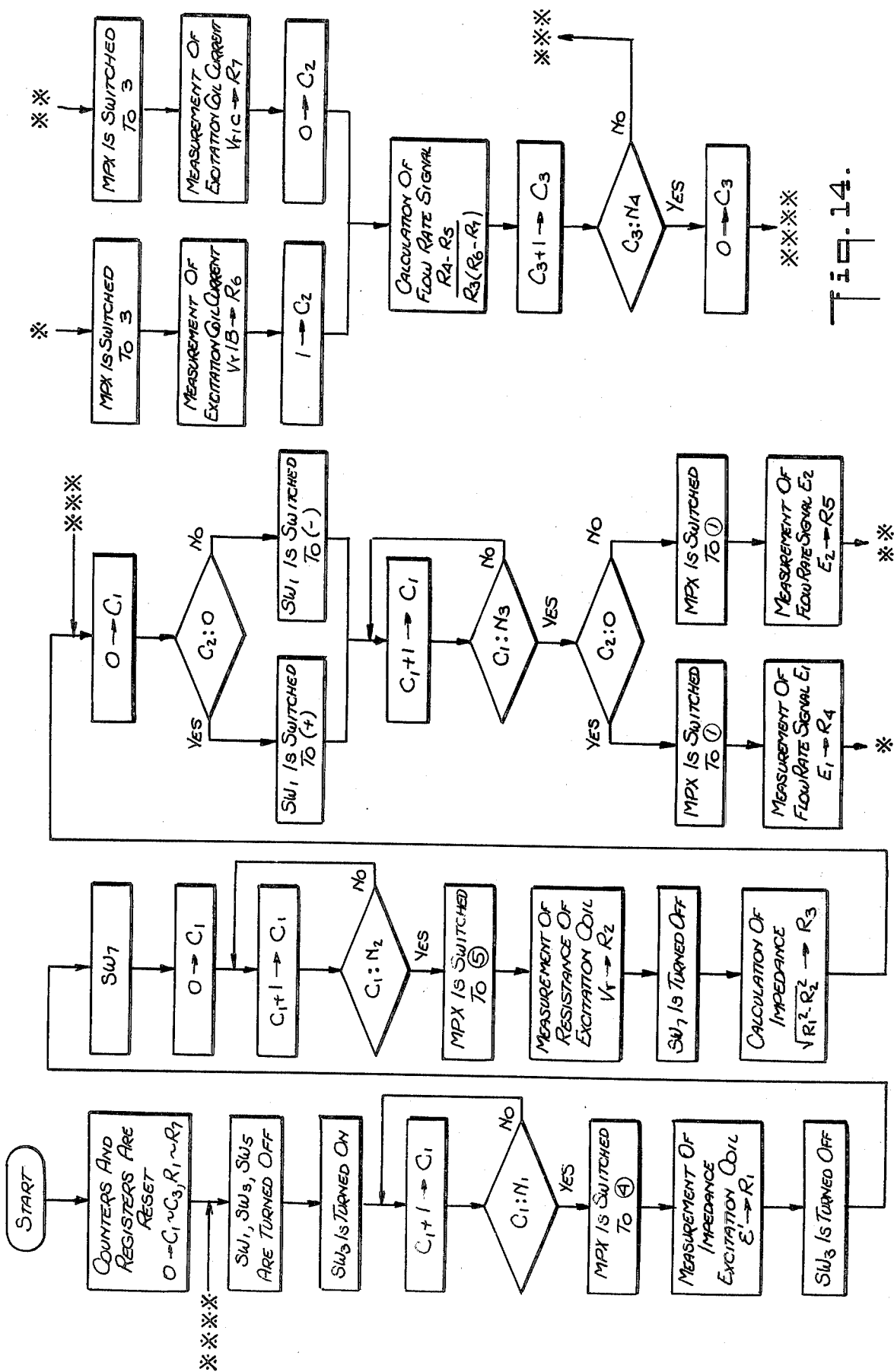
FIG. 14 is an operational flow chart for the fourth embodiment.

We shall now describe a modified form of FIG. 9 or 11 which employs a microcomputer for measurement and calculation in the embodiment of FIG. 4. FIG. 12 shows this fourth embodiment; FIG. 13 shows the waveforms occurring at various points in the circuit, while FIG. 14 shows a flowchart of its operation. The fourth embodiment is arranged to measure inductance L, taking into account that the DC resistance r based on the DC resistance and wiring resistance of excitation coil 3 are made negligible by equation 11 in the second and third embodiments.

In FIG. 12, the microcomputer portion and other elements corresponding to those in the first to third embodiments are identified by like reference numerals.

This embodiment is substantially identical to the arrangement of the microcomputer portion in the first embodiment shown in FIG. 4, but somewhat differs therefrom in the input signal to multiplexer 8 and the switch control signal from the input/output port 10. Consequently, the operation program entailed in this embodiment differs somewhat from that in the first embodiment.

Multiplexer 8, in addition to being supplied with input signal ① from the differential amplifier 7, is also supplied with a signal ③ representing voltage $V_{r_1}$ of resistor 41 for detecting excitation current when switch SW$_1$ is turned ON, a signal ④ representing the voltage of capacitor 29 which provides the voltage $\epsilon'$ proportional to the impedance of excitation coil 3 including its lead, and a signal ⑤ representing the voltage of a DC constant-current power source 46; that is, a voltage Vr proportional to the DC resistance of excitation coil 3 and its lead when switch SW$_7$ in the ON state.

These input signals are sequentially selected by multiplexer 8 and applied to A/D converter 9. Switch SW$_1$ for excitation use, Switch SW$_3$ for measuring the impedance and Switch SW$_7$ for measuring the DC resistance r are controlled by control signals 35, 37 and 47 from the input/output port 10, respectively.

As shown in FIG. 13(a), switch SW$_1$ performs the polarity-inverting operation for 10 cycles; for example, at 50/8 Hz and is thereafter held in the OFF state for 3.5 cycles. While switch SW$_1$ is in the OFF state, switch SW$_3$ is turned ON for the first 2.5 cycles, as depicted in FIG. 13(b), and switch SW$_7$ is turned ON for the latter 1 cycle, as depicted in FIG. 13(c). These operations are repeated. By the operation of each switch, excitation coil 3 is supplied with a current having a waveform as shown in FIG. 13(d). In FIG. 13, line (e) indicates the timing for sampling flow rate signals E$_1$ and E$_2$ in periods B and C for the input signal ①; line (f) indicates the voltage waveform of input signal ④; line (g) indicates the timing for sampling voltage $\epsilon'$ for the input signal ④; line (h) indicates the voltage waveform of input signal ⑤; and line (i) the timing for sampling voltage Vr for measuring the DC resistance r in input signal ⑤.

With reference to FIG. 14, we shall now briefly outline the operation of the fourth embodiment. In FIG. 14, reference characters C$_1$ to C$_3$ indicate counters; characters R$_1$ to R$_7$ designate registers; character N$_1$ identifies a period of time during which a constant current constant frequency for impedance measurement is applied to excitation coil 3; character N$_2$ denotes a period time during which a DC constant current for DC resistance measurement is applied to excitation coil 3; character N$_3$ represents a period of time during which a positive/negative excitation current is applied to coil 3; and character N$_4$ shows the num-er of cycles during which excitation current is applied in the positive and negative polarities. And *→*, →, *→* and **→** each indicate a return of the flow.

Step (i). Counters C$_1$ to C$_3$ registers R$_1$ to R$_7$ are reset.

Step (ii). Only switch SW$_3$ is turned ON to count time (N$_1$) for impedance measurement by counter C$_1$, and voltage $\epsilon'$ proportional to the impedance is measured and applied to register R$_1$. Letting the frequency and the constant current of the AC constant-current power source 25 be represented by f and I$_1$, respectively, the voltage $\epsilon'$ is given by the following expression:

$$\epsilon' = K_5 \sqrt{(2\pi f L)^2 + r^2} \cdot I_1 \quad \text{(Eq. 19)}$$

where L is an inductance, r is a DC resistance and K$_5$ is a constant.

Step (iii). Next, only switch SW$_7$ is turned ON and after the counting time (N$_2$) for measuring the DC resistance by counter C$_1$, voltage Vr proportional to DC resistance r is measured and entered into register R$_2$.

$$Vr = K_6 r \quad \text{(Eq. 20)}$$

where K$_6$ is a constant.

Step (iv) Inductance L is calculated with the following expression (21) derived from expressions (19) and (2), inductance L is entered into register R$_3$. From the expression (19) it follows that:

$$L = \frac{1}{2\pi f} \sqrt{\left(\frac{\epsilon'}{K_5 \cdot I_1}\right)^2 - r^2} \quad \text{(Eq. 21)}$$

-continued $$= \frac{1}{2\pi f} \sqrt{\left(\frac{\epsilon'}{K_5 \cdot I_1}\right)^2 - \left(\frac{V_r}{k_6}\right)^2}$$

Step (v). Only switch SW$_1$ is switched between the (+) and the (−) side alternately to measure flow rate signals E$_1$ and E$_2$ in periods B and C and voltages Vr$_{1B}$ and Vr$_{1C}$ of the resistor 41 proportional to the excitation current, these values being entered into registers R$_4$ to R$_7$, respectively.

Step (vi). From the stored contents of registers R$_3$ to R$_7$ and the preceding equation (7), the following expression is calculated, thereby obtaining voltage E' which does not depend on excitation current and the permeability of the fluid to be metered but is proportional to its velocity of flow.

$$E' = \frac{E_1 - E_2}{L(Vr_{1B} - Vr_{1C})} \quad \text{(Eq. 22)}$$

where K$_7$ is a constant.

Step (vii). Voltage E' is converted by voltage-current converter 14 into the corrected flow rate signal of, for example, 4 to 20 mADC, this being the ultimate output.

As has been described in detail in respect of each embodiment, the electromagnetic flowmeter in accordance with the present invention is designed to measure the inductance of the excitation coil and to correct a flow rate signal in accordance with the inductance, so that even if a ferromagnetic slurry or one having a like magnetic substance is to be metered, it is possible to obtain a signal proportional only to the velocity of flow of the liquid regardless of the concentration and composition of the magnetic substance, thereby attaining a high degree of accuracy in measurement.

Modifications

Figure 15:
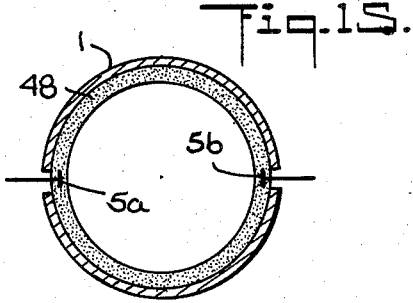
FIGS. 15 to 17 are sectional views of modified forms of electromagnetic flowmeter electrode arrangements.
Figure 17:
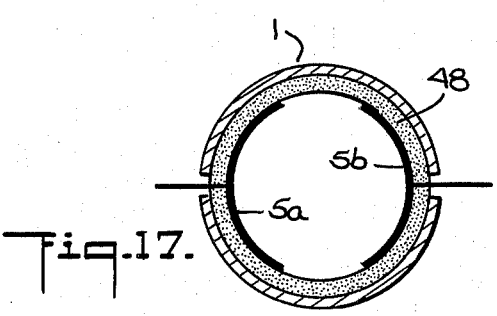
Figure 16:
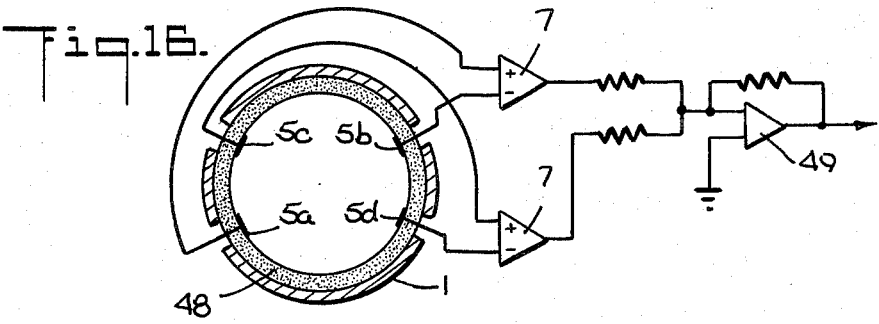

The excitation current waveforms for the coil is not limited specifically to those shown in the drawings, but, especially in the second to fourth embodiments, it may be a pulse waveform such as a rectangular wave, triangular wave or tri-state wave having positive-zero-negative-zero states, or a sinusoidal waveform. Further, the present invention is also applicable to an electromagnetic flowmeter employing a capacitance type electrode arrangement in which, in order to prevent wear or electrodes by the slurry being metered, the electrodes 5a and 5b are separated by an insulated lining 48 from the fluid, as shown in FIG. 15, and an electromotive force signal proportional to the velocity of flow of the fluid is obtained by utilizing the electrostatic capacitance between the fluid and electrodes 5a and 5b. Moreover, the present invention is equally applicable to an electromagnetic flommeter in which two pairs of electrodes 5a, 5b 5c and 5d are provided so as to lessen the influence of the distribution of the velocity of flow of the fluid, as shown in FIG. 16, wherein numeral 49 indicates a buffering amplifier, or in which electrodes large enough to be comparable with the diameter of flow tube 1 are employed as shown in FIG. 17.

While there have been shown and described preferred embodiments of an electromagnetic flowmeter for measuring ferromagnetic slurries in accordance with the invention, it will be appreciated that many changes and modifications may be made therein without, however, departing from the essential spirit thereof.

I claim:

1. An electromagnetic flowmeter for measuring the flow rate of a slurry containing ferromagnetic particles or a like magnetic substance which raises the specific permeability of the slurry above unity, said flowmeter comprising:

A a flow tube through which the slurry is conducted, said tube having a pair of diametrically-opposed electrodes mounted thereon;

B means to establish an electromagnetic field in the flow tube which is intercepted by the slurry to induce a signal in the electrodes which depends on flow rate, said means including an electromagnetic circuit whose core is provided with a gap defined by said tube and whose excitation coil is wound about the core, the magnetic resistance of the circuit changing as a function of the ferromagnetic concentration of the slurry, this change affecting the inductance value of the coil;

C means to measure the changing value of said inductance;

D means coupled to said electrodes to provide an output signal; and

E correction means responsive to said changing inductance value to modify said output signal as a function of said value to produce a corrected output signal which accurately reflects flow rate regardless of changes in ferromagnetic concentration.

2. A flowmeter as set forth in claim 1, wherein said coil is excited from a power source having a frequency which is low relative to that of the commercial power line for energizing said source.

3. A flowmeter as set forth in claim 1, wherein said means coupled to the electrodes includes an amplifier providing an amplified signal.

4. A flowmeter as set forth in claim 3, wherein said correction means includes an arithmetic unit responsive to said amplified signal and the measured value of the coil inductance to yield a signal in which the output of the amplifier is divided by a value proportional to the inductance.

5. A flowmeter as set forth in claim 4, wherein said arithmetic unit is a microprocessor.

* * * * *